United States Patent [19]

Kizu et al.

[11] Patent Number: 5,282,060
[45] Date of Patent: Jan. 25, 1994

[54] ANALOG/DIGITAL CONVERTER HAVING INPUT SIGNAL GAIN CONTROL FUNCTION

[75] Inventors: Shuji Kizu, Yokohama; Junichi Koseki; Jun Sakakibara, both of Tokyo, all of Japan

[73] Assignee: Kabushiki Kaisha Toshiba, Kawasaki, Japan

[21] Appl. No.: 744,401

[22] Filed: Aug. 13, 1991

[30] Foreign Application Priority Data

Aug. 20, 1990 [JP] Japan .................................. 2-217158

[51] Int. Cl.⁵ .............................................. H04N 1/38
[52] U.S. Cl. ..................................... 358/461; 358/464
[58] Field of Search ............... 358/461, 464, 465, 448, 358/163; H04N 1/40

[56] References Cited

U.S. PATENT DOCUMENTS

| | | | |
|---|---|---|---|
| 4,841,374 | 6/1989 | Kotani et al. | 358/464 |
| 5,038,225 | 8/1991 | Maeshima | 358/461 |
| 5,105,286 | 4/1992 | Sakurai | 358/461 |
| 5,119,211 | 6/1992 | Sakurai | 358/464 |
| 5,146,351 | 9/1992 | Maehara | 358/461 |

*Primary Examiner*—Stephen Brinich
*Attorney, Agent, or Firm*—Finnegan, Henderson, Farabow, Garrett & Dunner

[57] ABSTRACT

A gain control signal is produced according to the difference in level between the signal obtained by scanning the white reference plate and the previously stored standard signal. Based on the gain control signal, the amplification level of the signal obtained by scanning the document is adjusted by a gain controller, and then the resulting signal is converted into a digital signal and supplied outside.

6 Claims, 7 Drawing Sheets

| CONTROL SIGNAL | | | AMOUNT OF ATTENUATION (dB) |
|---|---|---|---|
| ENABLE (103a)(106a) | Sg1 (103b)(106b) | Sg0 (103b)(106b) | |
| 1 | — | — | 0 |
| 0 | 0 | 0 | 0 |
| 0 | 0 | 1 | 2 |
| 0 | 1 | 0 | 4 |
| 0 | 1 | 1 | 6 | ived in and constitute a part of the specification, illustrate a presently preferred embodiment of the invention,

ANALOG/DIGITAL CONVERTER HAVING INPUT SIGNAL GAIN CONTROL FUNCTION

BACKGROUND OF THE INVENTION

1. Field of the Invention

This invention relates to an analog/digital converter, used for a document reader such as a facsimile or a scanner, which converts the analog output signal of a photoelectric converting element into digital values.

2. Description of the Related Art

CCD (charge-coupled device) sensors are now widely used as photoelectric converting elements in document readers such as facsimiles or image scanners. CCD sensors of this type have undergone various improvements, so that even large-scale CCD sensors are now available.

With the increasing need for high-speed operation, high-quality picture, and coloration in such document readers, the signal processing of CCD sensor outputs is becoming more sophisticated. To achieve such sophisticated signal processing, special large-scale integrated circuits (LSIs) have been developed.

In conventional LSIs, however, the input level of analog signals to the LSIs must be adjusted using externally added variable resistors. The input voltage range to the A/D converter, which converts the CCD sensor output signal into digital values, must be held constant. Such adjustment has been done manually, which resulted in longer adjustment time for each unit and poor accuracy.

As noted above, conventional LSIs had the drawbacks of requiring manual adjustment of the analog signal input to LSIs and lacking accuracy.

SUMMARY OF THE INVENTION

Accordingly, the object of the present invention is to provide an analog/digital converter that provides automatic gain control of analog signals, securing a wide analog input range for large-scale integrated circuits, and achieves a reliable analog/digital conversion.

The foregoing object is accomplished by an imaging integrated circuit device arranged in a large scale integrated fashion, comprising:

generating means for generating a white reference signal with respect to an electric signal obtained from a photoelectric converting element;

sample-and-hold means for sampling and holding the white reference signal generated from the generating means;

amplifying means for amplifying the white reference signal sampled and held at the sample-and-hold means;

converting means for performing an analog/digital conversion of the signal amplified at the amplifying means to obtain a digital signal representing a white reference level; and control means for performing gain adjustment of the amplifying means based on the digital signal converted at the converting means.

In this invention, the above-mentioned means enable automatic optimum adjustment of the gain of the signal input to the A/D converting means according to the resulting A/D conversion output in reading the reference plate installed in the reader, which provides an easy, accurate gain control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Referring to the accompanying drawings, an embodiment of the present invention will be explained.

Figure 1:
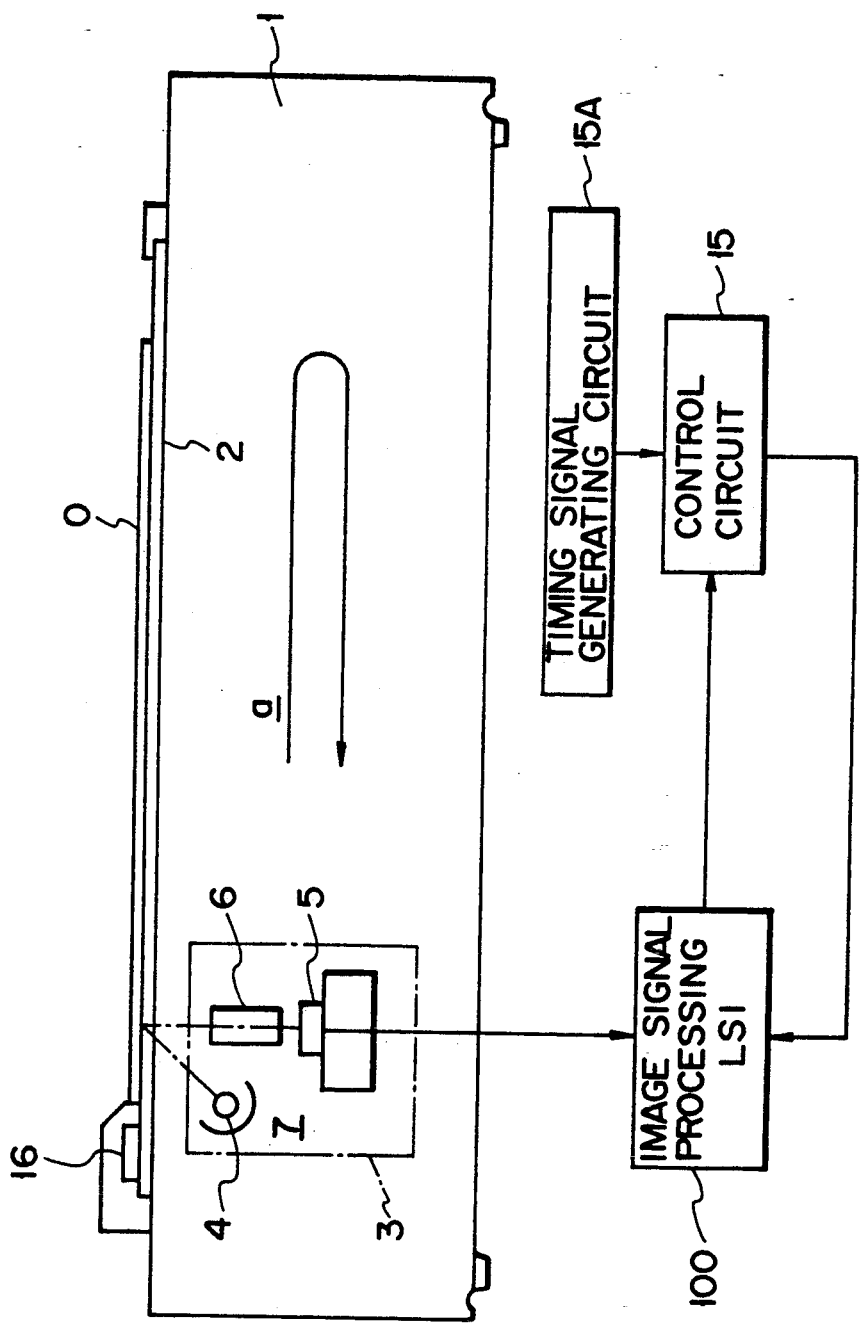
FIG. 1 is a schematic diagram of a document reader according to an embodiment of the present invention.
Figure 2:
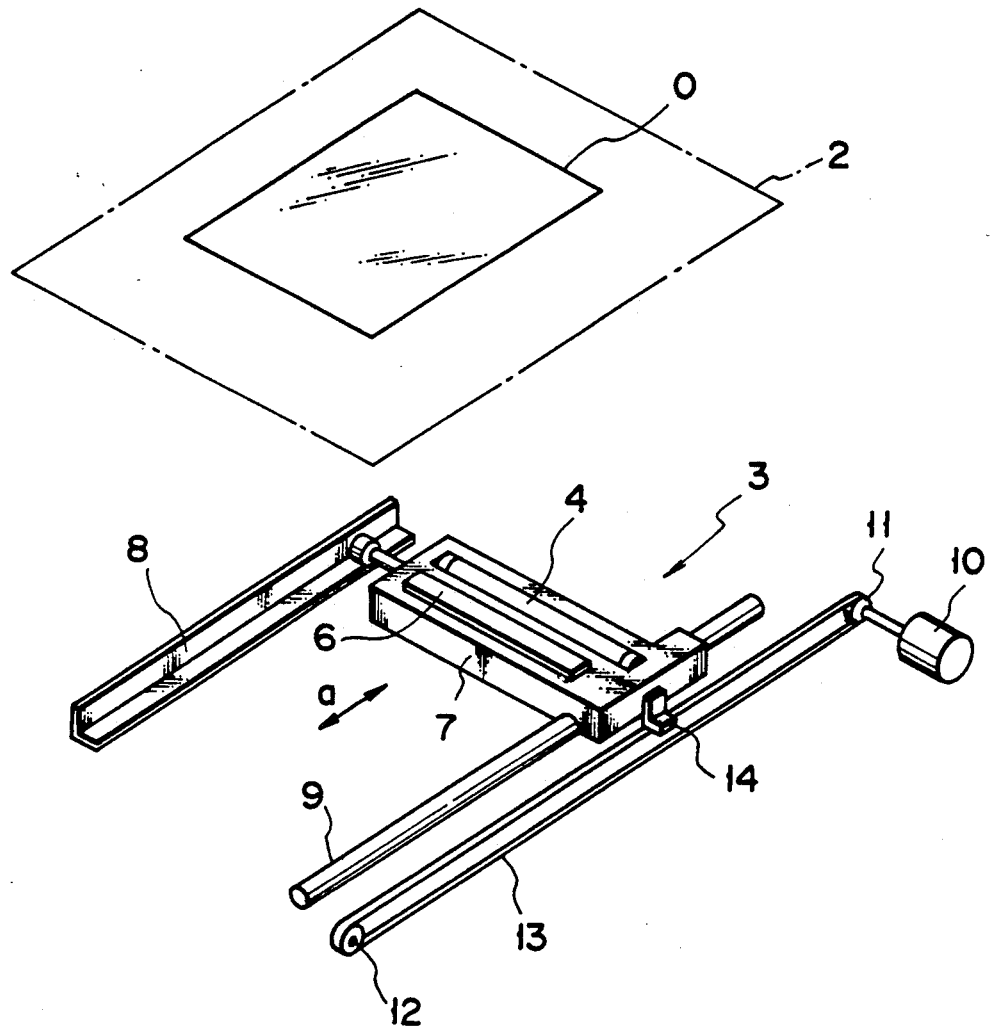
FIG. 2 is a perspective view for the document reader of FIG. 1.

FIGS. 1 and 2 show the construction of a document reader according to an embodiment of the present invention.

On the top surface of the scanner body 1, a document table (platen glass) 2 made of transparent glass is secured. Near the document table 2, there is a white reference plate 16, below which a document scanning section 3 is located.

The document scanning section 3, which optically scans the document O placed on the document table 2 by moving back and forth in the direction of arrow a shown in FIG. 1 along the bottom surface of the document table 2, is composed of an illuminating lamp (fluorescent lamp) 4, a photoelectric converting element 5 that receives the reflected light or transmitted light from the document O, an optical system (convergent lens) 6 that introduces the reflected light or transmitted light from a single line as read area of the document O into the photoelectric converting element 5, and a carriage 7 that supports all these components.

The photoelectric converting element 5, which produces an image signal of the document O as electric signal by performing a photoelectric conversion of the reflected light or transmitted light from the document O, is made up mainly of, for example, a CCD line image sensor.

The carriage 7 is guided by a guide rail 8 and guide shaft 9 so as to make a free reciprocating motion in the arrow a direction. On one side of the guide shaft 9, a driving pulley 11, which is driven by a stepping motor 10 as reversible scanning motor, is installed, while on the other side, a driven pulley 12 is installed. A timing belt 13 is installed around these pulleys 11 and 12. The timing belt 13 is secured to the carriage 7 at a single point via a fastening member 14 so that the direct or reverse drive of the stepping motor 10 may provide a linear movement of the carriage 7 along the guide shaft 9.

Within the scanner body 1, a control circuit 15, an image signal processing LSI 100 and a timing signal generating circuit 15A are provided.

The image signal processing LSI 100 converts the analog output (analog signal) from the photoelectric converting element 5 into digital values and supplies the digital signal. The timing signal generating circuit 15A is provided for generating timing signals such as those synchronized with an image reading period and those synchronized with an image transfer frequency.

The control circuit 15, which includes a CPU, has the function of instructing a mechanical feeding in the longitudinal direction of the document O (feed) and the lateral scanning of the document O (main scanning) as well as the function of controlling the image signal processing LSI 100.

Figure 3:
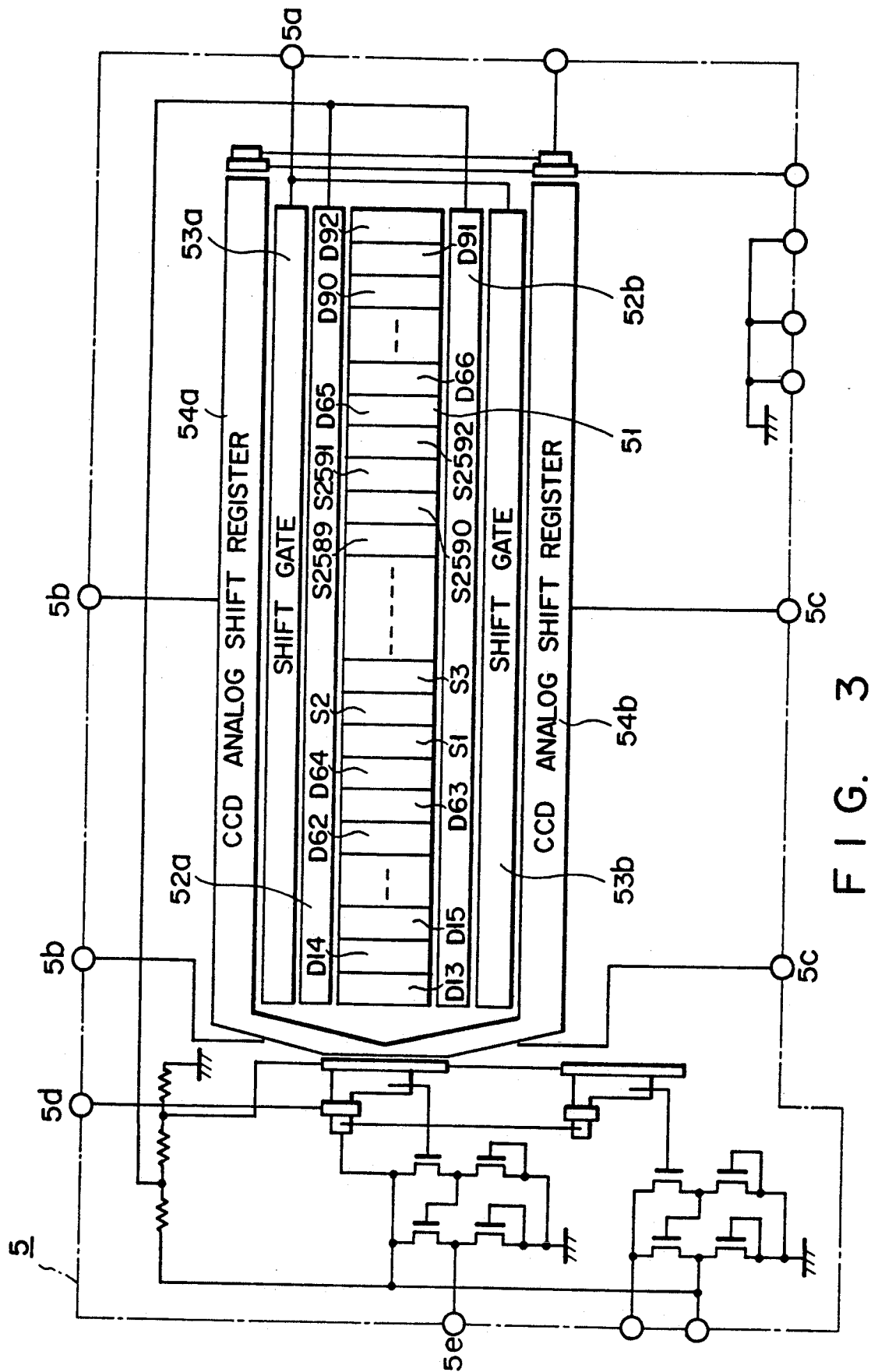
FIG. 3 is a schematic diagram of a photoelectric converting element according to an embodiment of the present invention.

FIG. 3 depicts the construction of the photoelectric converting element 5.

The photoelectric converting element 5 has a photodiode array 51 in its center, on both sides of which storage electrodes 52a and 52b, shift gates 53a and 53b, and CCD analog shift registers 54a and 54b are installed.

The central elements (photodiodes) S1 through S2592 of the photodiode array 51 are used for picture processing and the preceding and subsequent elements D13 through D64 and D65 through D92 are for dummy. The magnification of the optical system 6 is determined so that the total length of the image signal elements S1 through S2592 may coincide with the main scanning width. Of the dummy elements D13 through D64, the light-receiving surfaces of the elements D13 through D29 are covered with an aluminium evaporation film to shut out light, the film-covered elements serving as reference bits (black reference pixels) to create the reference voltage for the sensor output.

The photoelectric converting element 5 further comprises the necessary input and output sections, power supply section, and wiring connections.

Figure 4:
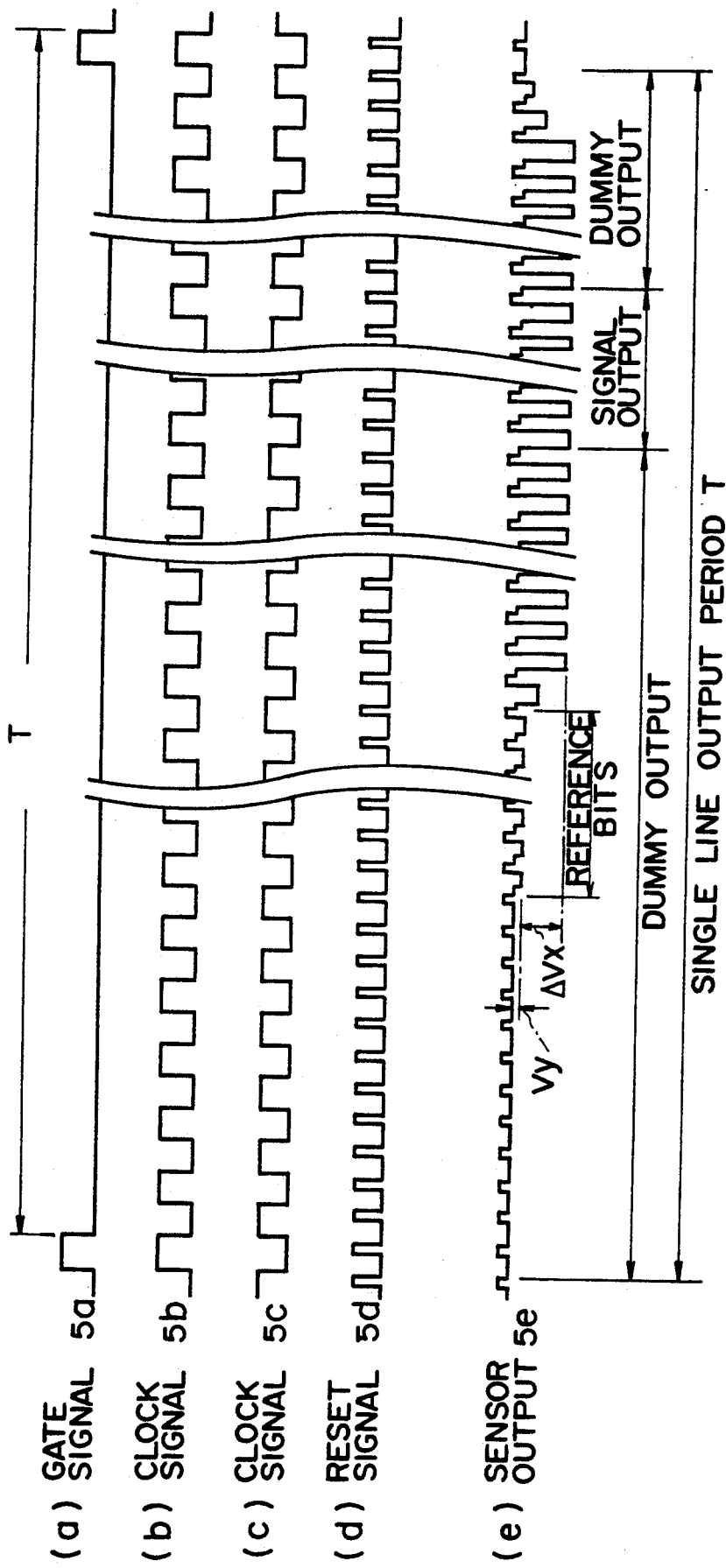
FIG. 4 shows signal waveforms at various parts of the photoelectric converting element of FIG. 3.

FIG. 4 shows signal waveforms at various parts of the photoelectric converting element 5.

The shift gates 53a and 53b are supplied with the gate signal 5a of FIG. 4 (a) (a single period of the signal is the main scanning period T, which is equal to the light-signal storage time).

The CCD analog shift registers 54a and 54b are supplied with the clock signals 5b and 5c of FIG. 4 (b) and (c), respectively.

Applied to the output gate, the reset signal 5d of FIG. 4 (d) initializes the voltage of the floating capacitor at the output stage so that the sensor output properly corresponds to the pixel data transferred from the shift registers 54a and 54b. The pulses of the registers 54a and 54b and the reset signal 5d are assigned to corresponding elements in time sequence.

The sensor output 5e of FIG. 4 (e) is supplied at the output terminal, and its output voltage (the output voltage during the dark period) $V_y$ during the reference bit period of the dummy output is used as the black reference voltage during the dark sensor period. A signal output voltage is produced in proportion to the amount of incident light, and an effective output voltage is $\Delta V_x$ which is obtained by subtracting $V_y$ from the sensor output 5e as shown in FIG. 4(e).

Figure 5A:
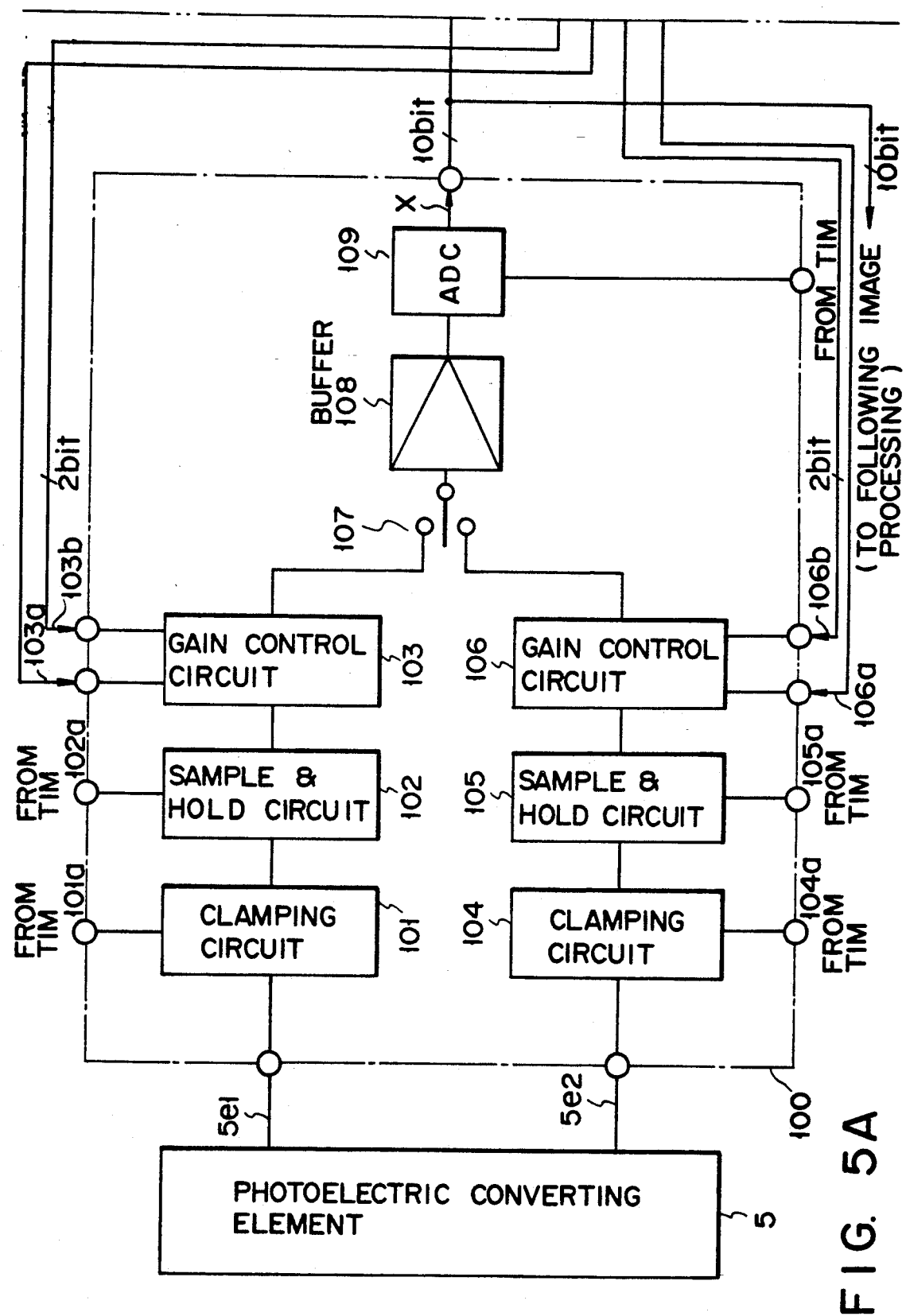
FIGS. 5A and 5B show, inclusively, a block diagram for an image signal processing LSI and a control circuit according to an embodiment of the present invention.
Figure 5B:
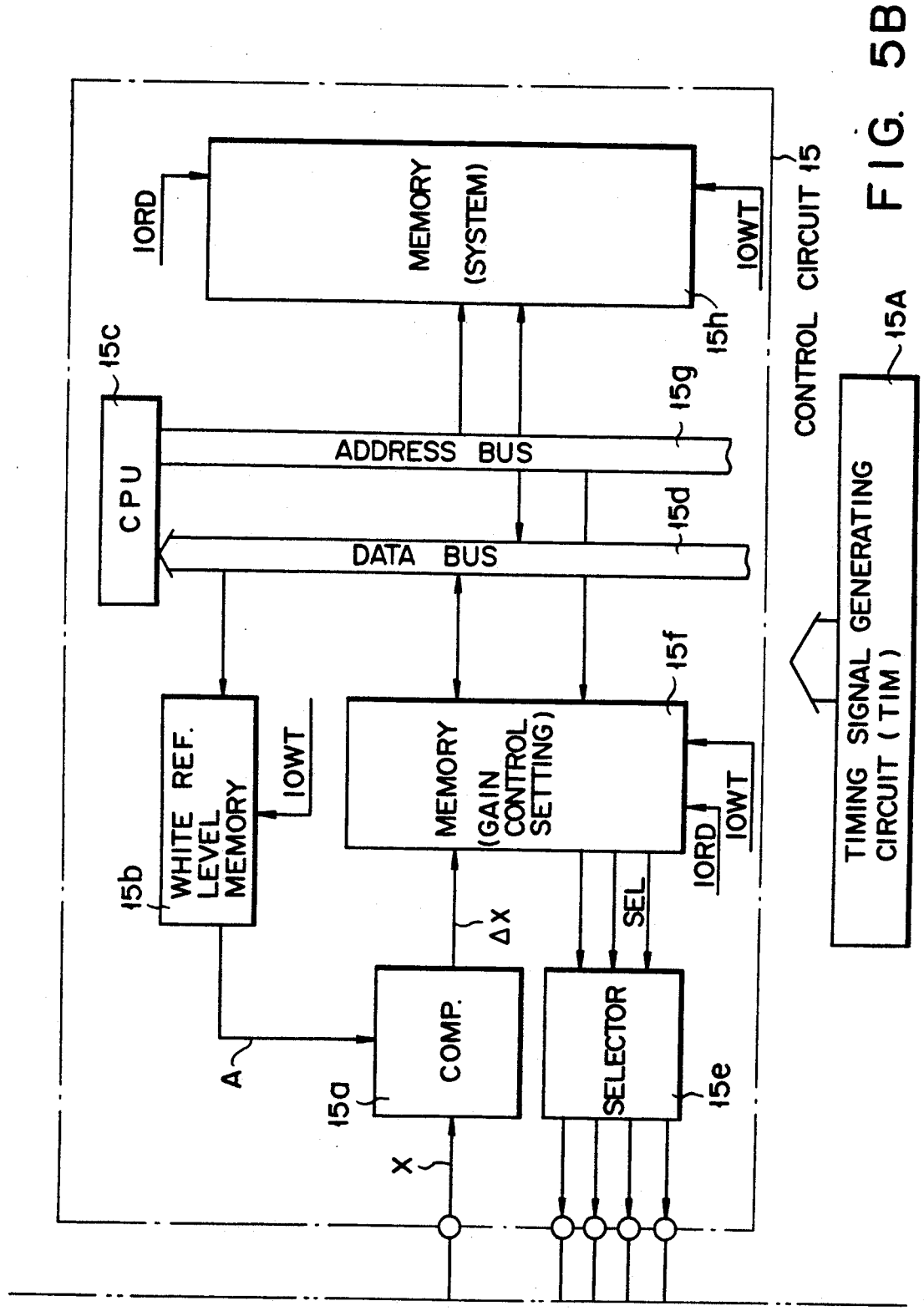

FIGS. 5A and 5B show the configuration of the image signal processing LSI 100 and the control circuit 15.

An example of applying the LSI 100 to a photoelectric converting element 5 with two-route outputs 5e1 and 5e2 will now be explained.

Specifically, the image signal processing LSI 100 comprises: a clamping circuit 101, a sample-and-hold circuit 102, and a gain control circuit 103, all of which process one-route output 5e1 from the photoelectric converting element 5; a clamping circuit 104, a sample-and-hold circuit 105, and a gain control circuit 106, all of which process the other-route output 5e2; a switch circuit 107 for combining the two route outputs from the gain control circuits 103 and 106 into a single route output; a buffer or an amplifier 108 for amplifying the output combined at the switch circuit 107; and an ADC 109 for converting the analog output of the amplifier 108 into digital values.

The clamping circuits 101 and 104 are used to set the voltage $V_y$ of the sensor output 5e of FIG. 4 (e) during the reference bit period at a specified reference level. They are controlled by the timing signals 101a and 104a supplied from the circuit 15A, respectively.

The sample-and-hold circuits 102 and 105, which are controlled by the timing signals 102a and 105a from the circuit 15A, sample and hold the outputs of the clamping circuits 101 and 104, respectively.

The gain control circuits 103 and 106, in which the amount of attenuation is controlled by the control signals 103a, 103b, 106a, and 106b from the control circuit 15, adjust the gain of the outputs of the sample-and-hold circuits 102 and 105. Since the amplification factor of the amplifier 108 is constant, too large an analog signal (sensor output 5e) supplied to the LSI 100 can exceed the reference voltage of the ADC 109 when amplified, and if this happens, malfunction may result. To avoid this situation, the gain control circuits 103 and 106 regulate the gain of the analog signal.

The switch circuit 107 operates so as to synthesize the inputs when receiving them from two different routes, whereas it functions as a select circuit when receiving the input from a single route.

The digital output X of 10 bits from the ADC 109 is supplied to one input terminal of a comparator 15a including the other input terminal to which a white reference level signal A read out from a white reference level memory 15b is supplied to obtain a difference signal $\Delta x(|A-X|)$. The memory 15b is connected to the data bus 15d and the address bus 15g which are controlled by a CPU 15c and a system memory 15h.

The output $\Delta x$ from the comparator 15a is supplied to a memory 15f as an address signal for reading out gain control value data corresponding to the value $\Delta x$. The memory 15f is further connected to the data bus 15d and the address bus 15g, and the output data read out therefrom is supplied to a selector 15e for selectively supplying output signals 103a, 103b, 106a and 106b to the LSI 100.

Figures 6, 7:
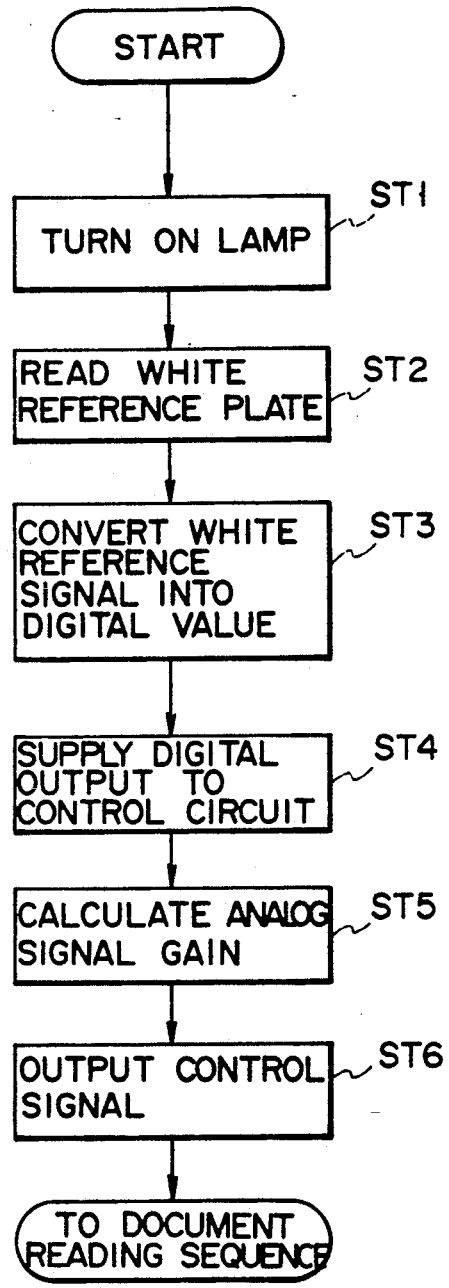
FIG. 6 illustrates the relationship between the control signal and the amount of attenuation in connection with the embodiment.
FIG. 7 is a flowchart for explaining the operation of the embodiment.

FIG. 6 illustrates the relationship between the control signals and the amount of attenuation in the gain control circuits 103 and 106.

Each of the control signals 103a and 106a is assigned a single bit as enable signal, while control signals 103b and 106b are assigned two bits of signal Sg1, Sg0.

In the embodiment, when the enable signal is "1", the amount of attenuation is 0 dB irrespective of the state of signal Sg1, Sg0.

When both the enable signal and the signal Sg1, Sg0 are 0, the amount of attenuation is also 0 dB.

With the enable signal being "0", when signal Sg1, Sg0 is (0, 1), the amount of attenuation is 2 dB; when (1, 0), 4 dB, and when (1, 1), 6 dB.

Increase of the number of bits to the signal Sgn (n=0, 1) enables more precise control or a larger amount of attenuation.

The operation of the embodiment constructed as described above will now be explained.

In FIG. 7, with the document scanning section 3 positioned so as to correspond to the white reference plate 16, the illuminating lamp 4 is turned on (step ST1). Then, the reflected light from the white reference plate 16 illuminated by the lamp 4 forms an image on the photoelectric converting element 5 via the optical system 6 (step ST2). The photoelectric converting element 5 then supplies sensor outputs 5e1 and 5e2 of FIG. 4 (e), which are supplied as analog signal to the image signal processing LSI 100.

The analog signals, or the white reference signals 5e1 and 5e2, supplied to the image signal processing LSI 100 are sent to the ADC 109 by way of the following circuits: the clamping circuits 101 and 104, sample-and-hold circuits 102 and 105, gain control circuits 103 and 106, switch circuit 107, and amplifier 108. The analog signals are then converted into digital values at the ADC 109 (step ST3). The digital output X of the ADC 109 is sent to the control circuit 15 including the CPU 15c (step ST4), which calculates a gain from a memory 15f to optimize the input level of analog signal to the ADC 109 (step ST5). Specifically, the control circuit 15 previously stores the white reference level digital signal A in the memory 15b and calculates the difference $|A-X|=\Delta X$ between the stored digital signal A and the output X of the ADC 109. By using the difference signal $\Delta X$ as address signal, the control signals 103a, 103b, 106a, and 106b, which correspond to the amount of attenuation that optimizes the gain of the analog signal to the ADC 109, are read from the memory 15f of the control circuit 15 and supplied to the gain control circuits 103 and 106 (step ST6) via the selector 15e. As a result, a constant supply of an optimum-level analog signal to the ADC 109 can be realized.

After the gain for the gain control circuits 103 and 106 have been determined, the document scanning section 3 starts to move and the document O set on the document table 2 is read.

As stated above, the gain of the signal supplied to the ADC 109 is automatically adjusted to an optimum level, depending on the A/D conversion output in reading the white reference plate 16.

Specifically, the illuminating lamp 4 in the document scanning section 3 is turned on so that the output of the ADC 109 obtained by reading the white reference plate 16 may be supplied to the control circuit 15, which in turn provides a control signal that optimizes the gain of the input signal to the ADC 109, with which digital control is performed so as to control the gain of the analog signal input to the ADC 109. This enables an easy, accurate external adjustment of the analog signal input level in the LSI 100. Therefore, a wide analog input range is assured for the LSI 100 and a reliable A/D conversion is also achieved.

While in the embodiment, the white reference plate 16 is read, other approaches may be used. For example, instead of the white reference plate 16, a white background of the document may be read for gain control purposes, which provides the same effect as described above. Further, it is possible to control the amplification factor for a small input signal at the gain control circuit having the similar configuration.

This invention may be practiced and embodied in still other ways without departing from the spirit or essential character thereof.

As described in detail, according to the present invention, the gain control of the analog signal input to the analog/digital converter can be digitally adjusted from outside the large-scale integrated circuit. Thus, this invention provides an image integration circuit device that allows automatic gain control of analog signals, assuring a wide analog input range for large-scale integrated circuits, and achieves a reliable analog/digital conversion.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image reading apparatus comprising:
    means for converting an analog signal to a digital signal; means for controlling in a digital manner, a gain of the analog signal to be supplied to said converting means;
    means for reading a white reference medium to obtain digital white reference data;
    means for storing digital gain control data for controlling the gain of the gain controlling means;
    means for obtaining difference data between the digital white reference data and the digital signal;
    means for reading the stored digital gain control data from the storing means in accordance with the difference data;
    means for calculating analog signal gain data containing predetermined bits representing the gain of the analog signal in accordance with the digital gain control data; and
    means for supplying the calculated analog signal gain data to the gain controlling means.

2. An image reading apparatus comprising:
    an integrated circuit including a digital gain control circuit for controlling a gain of an analog image signal and an analog-to-digital converter to output a digital image signal; and
    a digital control circuit including means for storing white reference data obtained by scanning a predetermined white reference medium, means for comparing levels of the digital image signal and the white reference data to obtain level difference data, table means for outputting digital gain control data in accordance with the level difference data as an address data; and means for calculating, from the digital gain control data, an analog signal gain to be supplied to the digital gain control circuit.

3. An image reading apparatus according to claim 2, wherein said integrated circuit is formed as a large scale integrated circuit; and
    said large scale integrated circuit further includes:

sample-and-hold means for sampling and holding the analog image signal to be supplied to said digital gain control circuit; and buffer means for storing the analog image signal of which gain is controlled by said digital gain control circuit before the analog image signal is supplied to said analog-to-digital converter.

4. An image reading apparatus according to claim 2, wherein said calculating means provided in said digital control circuit further includes a central processing unit for calculating the digital gain control data.

5. An image reading apparatus according to claim 2, wherein said white reference medium includes a discrete white reference plate.

6. An image reading apparatus according to claim 2, wherein said white reference medium includes a white background of a document to be read by said image reading apparatus.

* * * * *